United States Patent
Ji et al.

(10) Patent No.: US 8,862,171 B2
(45) Date of Patent: Oct. 14, 2014

(54) METHOD AND APPARATUS FOR ALLOCATING RESOURCE OF COMMON CONTROL CHANNEL WITH DEDICATED REFERENCE SIGNAL

(75) Inventors: Hyoungju Ji, Seoul (KR); Younsun Kim, Seongnam-si (KR); Joonyoung Cho, Suwon-si (KR); Cheng Shan, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 313 days.

(21) Appl. No.: 13/524,513

(22) Filed: Jun. 15, 2012

(65) Prior Publication Data
US 2012/0322483 A1    Dec. 20, 2012

(30) Foreign Application Priority Data
Jun. 15, 2011    (KR) .......................... 10-2011-0057892

(51) Int. Cl.
*H04B 7/00*    (2006.01)
*H04L 5/00*    (2006.01)
*H04W 72/04*    (2009.01)

(52) U.S. Cl.
CPC ............... *H04L 5/00* (2013.01); *H04W 72/042* (2013.01); *H04W 72/0406* (2013.01)

USPC ........... 455/509; 455/515; 455/511; 455/450; 455/517; 370/328; 370/329; 370/338; 370/343

(58) Field of Classification Search
CPC ......................... H04W 72/042; H04W 72/0406
USPC ......... 455/509, 508, 507, 500, 517, 511, 515, 455/516, 445, 550.1, 450, 451, 452.1, 455/452.2, 426.1, 426.2, 403, 422.1, 455/456.1–457, 466; 370/328, 329, 338, 370/343
See application file for complete search history.

(56) References Cited

U.S. PATENT DOCUMENTS 8,681,719 B2 *    3/2014    Montojo et al. ............... 370/329
8,705,461 B2 *    4/2014    Bala et al. ..................... 370/329

* cited by examiner

*Primary Examiner* — Keith Ferguson
(74) *Attorney, Agent, or Firm* — The Farrell Law Firm, P.C.

(57) ABSTRACT

A method for allocating resources of a common control channel includes determining a carrier type, allocating, when the carrier is backward compatible, resources for a Physical Control Format Indicator CHannel (PCFICH), and allocating resources for a common control channel with a dedicated reference signal based on a Physical Resource Block allocated for the PCFICH. A UE can receive the common control channel without extra signaling by mapping the common control channel to the frequency resource based on the cell-specific parameter or channel.

14 Claims, 12 Drawing Sheets

METHOD AND APPARATUS FOR ALLOCATING RESOURCE OF COMMON CONTROL CHANNEL WITH DEDICATED REFERENCE SIGNAL

PRIORITY

This application claims priority under 35 U.S.C. §119(a) to Korean Patent Application Serial No. 10-2011-0057892, which was filed in the Korean Intellectual Property Office on Jun. 15, 2011, the content of which is incorporated herein by reference.

BACKGROUND OF THE INVENTION

1. Field of the Invention

The present invention relates generally to a control channel resource allocation method and apparatus of a mobile communication system and, more particularly, to a method and apparatus for allocating resources of a Common Control Channel (CCCH) with a Dedicated Reference Signal (DRS) in a mobile communication system.

2. Description of the Related Art

Mobile communication systems provide subscribers in motion with voice communication services. With the rapid advance of technology, the mobile communication systems have evolved to support high-speed data communication services as well as the standard voice communication services. However, the limited resource and user requirements for higher speed services in the current mobile communication system has spawned the growth of more advanced mobile communication system.

Long Term Evolution (LTE) and LTE-Advanced (LTE-A) are being standardized as the next generation mobile communication system of the $3^{rd}$ Generation Partnership Project (3GPP). LTE-A is a technology for realizing high-speed packet-based communication at about up to 1 Gbps, aiming at commercial deployment around 2012. To this end, discussions are being held on several schemes such as network multiplexing for deploying multiple evolved Node Bs (eNBs) overlappingly in a specific area and increase of frequency bands supported by an eNB.

In LTE, the control channel is designed based on the distributed transmission concept, which aims to minimize and distribute inter-cell interference and maximize frequency diversity gain. LTE-A is designed in consideration of the environment having high inter-cell interference probability due to the very closely deployed cells. Accordingly, the control channel designed based on the distributed transmission scheme has a drawback of inevitable inter-cell interference.

Particularly in LTE-A supporting MU-MIMO transmission, it is difficult to fulfill the performance requirement with the control channel designed for LTE. For this reason, a new control channel is required and, as a consequence, recent studies are underway to suggest a method for transmitting the control channel at a specific frequency region. This region is User Equipment-specific (UE-specific) so as to be transmitted with a dedicated reference signal. This requires the introduction of a new control channel as the UE has to receive both the command and dedicated control channels.

The common control channel should be designed so as to be received by all UEs on the same resource and thus, in using the dedicated control channel, there is a need of a method for transmitting/receiving and demodulating the signal transmitted on the dedicated control channel.

SUMMARY OF THE INVENTION

The present invention has been made in an effort to solve the above problem and cure the above needs, and it is an object of the present invention to provide a method and apparatus for allocating resource of the common control channel with dedicated reference signal that is capable of determining the location of the common control channel, which has been transmitted with dedicated reference signal, in consideration of the location of the cell-specific control channel region indication channel on the compatible carrier and the location of the control channel region indication channel of the compatible carrier on the incompatible carrier having no control channel region indication channel, without extra signaling.

In accordance with an aspect of the present invention, a common control channel resource allocation method of a base station transmitter includes determining a type of a carrier, allocating, when the carrier is a backward compatible carrier, resource for Physical Control Format Indicator Channel (PCFICH), and allocating resource for a common control channel with dedicated reference signal based on a Physical Resource Block (PRB) allocated for the PCFICH.

In accordance with another aspect of the present invention, a common control channel resource allocation method of a base station transmitter includes determining a type of a carrier, and determining, when the carrier is a non-backward compatible carrier, a location of a common control channel of a non-backward compatible cell based on a location of a common control channel of a backward compatible cell.

In accordance with another aspect of the present invention, a common control channel reception method of a terminal receiver includes determining a type of a carrier, receiving, when the carrier is a backward compatible carrier, a PCFICH using a common reference signal, and receiving a control channel region with the common reference signal and a control channel region with a dedicated reference signal.

In accordance with another aspect of the present invention, a control channel reception method of a terminal receiver includes determining a type of a carrier, receiving, when the carrier is a backward compatible carrier, a PCFICH using a common reference signal, and receiving a control channel region with dedicated reference signal without receipt of control channel region with common reference signal.

In accordance with another aspect of the present invention, a control channel reception method of a terminal receiver includes determining a type of a carrier, calculating, when the carrier is a non-backward compatible carrier, a location of a common control channel of the non-backward compatible carrier which is mapped based on a location of the common control channel of a backward compatible carrier, and receiving the common control channel at the calculated location.

In accordance with another aspect of the present invention, a base station transmitter includes a common control information generator which generates common control channel information, a dedicated control information generator which generates terminal-specific dedicated control channel information, a controller which allocates, when a carrier is a backward compatible carrier, resource for a PCFICH and resource for a common control channel with dedicated reference signal based on a PRB allocated for the PCFICH and allocates, when the carrier is a non-backward compatible carrier, resource for common control channel of non-backward compatible cell based on the location of the common control channel of a backward compatible cell; and a mapper which maps the control channels to corresponding resources under the control of the controller.

In accordance with another aspect of the present invention, a signal reception apparatus of a terminal includes a receiver which receives a signal transmitted by a base station, a controller which calculates a location of a control channel region based on a PCFICH and receives a control channel at the calculated location, and a Physical Downlink Control channel (PDCCH) decoder and an evolved PDCCH (ePDCCH) decoder which process signal in the control channel region under the control of the controller.

BRIEF DESCRIPTION OF THE DRAWINGS

The above and other aspects, advantages, and features of certain embodiments of the present invention will become apparent to those skilled in the art from the following detailed description taken in conjunction with the accompanying drawings, in which.

DETAILED DESCRIPTION OF EMBODIMENTS OF THE PRESENT INVENTION

Figure 1:
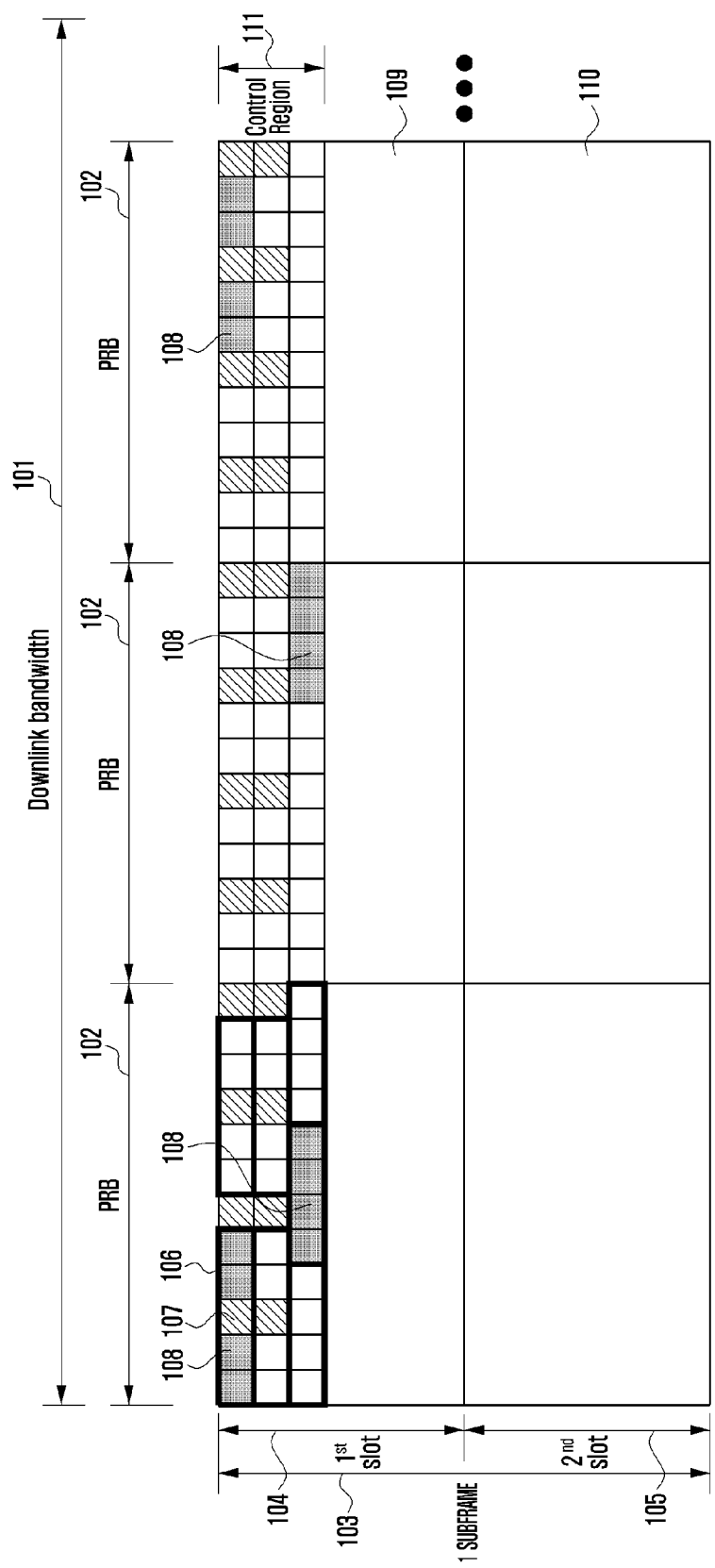
FIG. 1 illustrates a control channel structure of a subframe for use in the LTE system to which the present invention is applied.

Embodiments of the present invention are described with reference to the accompanying drawings in detail. The same reference numbers are used throughout the drawings to refer to the same or like parts. Detailed descriptions of well-known functions and structures incorporated herein may be omitted for the sake of clarity and conciseness.

Although the description is directed to the LTE and LTE-A systems, it will be understood by those skilled in the art that the subject matter of the present invention can be applied to other mobile communication systems supporting the base station scheduling with a slight modification, without departing from the sprite and scope of the invention.

OFDM is a transmission technique for transmitting data using multiple carriers, i.e. multicarrier data transmission technique which parallelizes the serial input stream into parallel data streams and modulates the data streams onto the orthogonal multiple carriers, i.e. sub-carrier channels.

The multicarrier modulation scheme was developed in the late 1950's for microwave radio for military communication purposes, and OFDM using orthogonal overlapping multiple subcarriers was developed in 1970's but was limited in application to commercial systems due to the difficulty of implementing orthogonal modulations between multiple carriers. However, the OFDM technology has developed rapidly with the introduction of the use of a Discrete Fourier Transform (DFT) for implementation of the generation and reception of OFDM signals, by Weinstein, in 1971. Additionally, the introduction of a guard interval at the start of each symbol and use of a Cyclic Prefix (CP) overcomes the negative effects caused by multipath signals and delay spread.

Thus, the OFDM technology is applied in various digital communications fields such as Digital Audio Broadcasting (DAB), Digital Video Broadcasting (DVB), Wireless Local Area Network (WLAN), and Wireless Asynchronous Transfer Mode (WATM). That is, the implementation of OFDM could be accomplished by reducing implementation complexity with the introduction of various digital signal processing technologies such as Fast Fourier Transform (FFT) and Inverse Fast Fourier Transform (IFFT).

OFDM is similar to Frequency Division Multiplexing (FDM) but is much more spectrally efficient for achieving high-speed data transmission by orthogonally overlapping multiple subcarriers. Due to the spectral efficiency and robustness to the multipath fading, OFDM has been considered as a prominent solution for broadband data communication systems.

Other advantages of OFDM are to control the Inter-symbol Interference (ISI) using the guard interval and reduce the complexity of the equalizer in view of hardware as well as spectral efficiency and robustness to the frequency selective fading and multipath fading. OFDM is also robust to the impulse noise so as to be employed in various communication systems.

In wireless communications, high-speed, high-quality data services are generally hindered by the channel environments. In wireless communications, the channel environments suffer from frequent changes not only due to Additive White Gaussian Noise (AWGN) but also power variation of received signals, caused by a fading phenomenon, shadowing, a Doppler effect brought on by movement of a UE and a frequent change in a velocity of the UE or interference by other users or multipath signals, for example. Therefore, in order to support high-speed, high-quality data services in wireless communication, there is a need to efficiently overcome the above channel quality degradation factors.

In OFDM, modulation signals are located in the two-dimensional time-frequency resources. Resources on the time domain are divided into different OFDM symbols, and are orthogonal with each other. Resources on the frequency domain are divided into different tones, and are also orthogonal with each other. That is, the OFDM scheme defines one minimum unit resource known as a Resource Element (RE), by designating a particular OFDM symbol on the time domain and a particular tone on the frequency domain. Since different REs are orthogonal with each other, signals transmitted on different REs can be received without causing interference to each other.

A physical channel is defined on the physical layer for transmitting modulation symbols obtained by modulating one or more coded bit sequences. In an Orthogonal Frequency Division Multiple Access (OFDMA) system, a plurality of physical channels can be transmitted depending on the usage of the information sequence or receiver. The transmitter and receiver determine REs on which a physical channel is transmitted, in a process called mapping.

The method and apparatus for allocating common control channel resource with a dedicated signal according to the present invention determines the location of the common control channel in consideration of the location of the control channel region Indication CHannel (PCFICH) per cell without additional signaling when transmitting the common control channel with dedicated reference signal and allocates resource such that the UE can receiving the common control channel on the incompatible carrier having no PCFICH in consideration of the location of the control channel region indication channel of the compatible carrier.

The transmission procedure of the eNB transmitter according to the present invention is described hereinafter.

The eNB transmitter allocates resources for a common control channel with a dedicated reference signal in units of PRB having PCFICH REGs. The eNB transmitter maps the common control channel to the first slot following the consecutive PRBs and common reference signal control channel. The eNB transmitter may map the common control channel to two consecutive slots following the PRB and common reference signal control channel. The eNB transmitter may map the common control channel to consecutive PRB and two consecutive slots.

In the incompatible carrier having no PCFICH, the eNB transmitter locates the common control channel of the incompatible cell based on the location of the common control channel of the compatible cell.

The reception procedure of the UE according to the present invention is described hereinafter.

The UE receiver receives a cell Identifier (ID) and determines the REG location for PCFICH and the PRB including the REG in sequence.

The UE receiver receives a control channel region with common reference signal and the control channel region with dedicated reference signal in sequence. The UE receiver receives the common control channel with dedicated control signal in the consecutive PRBs including the PCFICH REG and the first slot region.

Second, the UE receiver may receive the common control channel with a dedicated reference signal, as determined by the PRB including REG of PCFICH, and two consecutive slots region following the control channel region with the common reference signal.

Third, the UE receiver may receive the control channel region with a dedicated reference signal without receipt of the control channel region with common reference signal. The UE receiver receives the common control channel in PRB including PCFICH REG and the first slot region consecutively. The UE receiver also may receive the common control channel, as determined by the PRB having PCFICH REG, and two consecutive slots region.

Fourth, the UE receiver connects to a compatible cell to receive a cell ID and determine the location of the PCFICH REG and determines the PRB having the REG in sequence.

Fifth, the UE receiver may acquire the incompatible cell information and receive the common control channel in the location determined based on the common control channel location of the compatible channel.

The eNB transmitter operating as above according to the present invention includes a resource allocator for determining the resource for the common control channel, a controller for transmitting on the common control channel, a dedicated reference signal generator for generating dedicated reference signal for common control channel, and a common control channel signal generator for generating common control channel signal with dedicated reference signal.

The UE receiver according to the present invention includes a resource receiver for determining the resource for common control channel, a receiver for receiving information through common control channel, a dedicated reference signal receiver for common control channel, and a channel estimator.

An embodiment of the present invention discloses a method for mapping the common control channel to the resources continuous in frequency and time domains in view of PRB including PCFICH REG. Another embodiment of the present invention discloses a method for indicating the amount of resources continuous in frequency and time domains with 2-bit value of PCFICH along with the first embodiment. Another embodiment of the present invention discloses a method for allocating a common control channel in an addition cell in PRB carrying PCFICH of PCell or reference cell. LTE and LTE-A systems are the representative systems adopted OFDM in downlink and Single Carrier-Frequency Division Multiple Access (SC-FDMA) in uplink.

FIG. 1 illustrates a control channel structure of a subframe for use in the LTE system to which the present invention is applied. The subframe structured as shown in FIG. 1 is compatible in the LTE-A system.

Referring to FIG. 1, the downlink bandwidth 101 is divided into a plurality of Resource Blocks (RBs), and each RB 102 consists of 12 frequency tones in frequency domain and 14 or 12 OFDM symbols in time domain. On subframe 103 is 1 ms in length and consists of 2 slots 104 and 105.

The Reference signal (RS) is transmitted by the eNB for the UE's channel estimation, and there are two types of reference signals: Common RS (CRS) and Dedicated RS (DRS). The CRS 107 is transmitted through antenna ports 0 and 1 of the eNB having two transmit antennas and antenna ports 0, 1, 2, and 3 of the eNB having four transmit antennas. If the number of antenna ports is more than 1, the multi-antenna scheme is adopted. In the frequency domain, the absolute position of the RB is configured differently depending on the cell while maintaining the relative distance between RBs. That is, the RS is transmitted at an interval of 6 RBs per antenna port, and the absolute position of the RB is configured differently for the cells to avoid RS collision among cells.

The number of RSs differs according to the antenna port. For the antenna ports 0 and 1, a total of 8 RSs exist in a single RB or subframe, while for the antenna ports 2 and 3, a total of 4 RSs exist in a single RB or subframe. The CRS is configured in order for all of the UEs to receive the CRS and thus the same pattern is applied to all of the RBs across entire downlink bandwidth. The DRS may be transmitted through multiple ports such as CRS depending on its configuration. The LTE system may use 1 port while the LTE-A system may use up to 8 ports with 4 different resources and two scrambling codes. The DRS is transmitted at a data region 108 and 109 of a specific PRB scheduled for transmission to a specific UE.

The control channel information of LTE is arranged at the beginning of each subframe in the time domain. In FIG. 1, reference number 111 denotes the control region in which the control channel signal is transmitted. The control channel information may be transmitted over a few OFDM symbols at the beginning of the subframe and the number of OFDM symbols is determined by the Control Format Indicator carried in the Physical Control Format Indicator Channel (PCFICH). That is, PCFICH indicates a number of OFDM symbols used for a PDCCH, whether 1, 2, or 3, which indicates that the CFI contains a code word representing 1, 2, or 3.

FIG. 1 shows the control region 111 when the CFI is 3. When the control channel amount is small enough to be carried by one OFDM symbol, only the first OFDM symbols at the beginning of the subframe is used for the control channel signal (CFI=1) while the remaining 13 OFDM symbols (11 OFDM symbols when the total number of OFDM symbols is 12) are used for transmitting data channel. L representing CFI value can be used as the basic information for allocated control channel resource demapping in control channel reception operation such that it is impossible to recover the control channel without acquiring L.

The control channel signal is located at the beginning of the subframe so that the UE may determine whether to perform data channel reception operation depending on the presence of the data channel signal addressed to the current UE. If there is no data channel signal addressed to the UE, it is not necessary for the UE to attempt data channel decoding so as to save the power consumption required for data channel reception. Also, by receiving the control channel at the beginning of the subframe prior to the data channel, it is possible to reduce a scheduling delay.

The PDCCH 105 is a physical channel for transmitting common control channel and dedicated control channel including data channel allocation information, and allocation information for system information transmission or power control information. The PDCCH can be configured with different channel coding rates depending on the channel state of the UE. Since the Quadrature Phase Shift Keying (QPSK) is fixedly used for PDCCH transmission, it is necessary to change the resource amount in order to change the channel coding rate. The UE operating in a good channel condition uses a high channel coding rate to reduce the resource amount.

The UE operating in a poor channel condition uses a low channel coding rate although it costs resource amounts. The resource amount for each PDCCH is determined in units of Control Channel Element (CCE). A CCE consists of a plurality of Resource Element Groups (REGs) 105. The REG of PDCCH is interleaved to guarantee diversity and distribute inter-cell interference and then allocated on the control channel region of PRBs across the entire bandwidth as denoted by reference numbers 105 and 106.

The interleaving is performed to all of the REGs of the subframe that are determined by L. The output of the control channel interleaving is designed to space the REGs of the control channel allocated across one or more symbols far enough to acquire diversity gain while avoiding inter-cell interference caused by use of the same interleaver for the cells. Also, it guarantees uniform distribution of the REGs constituting the same channel across the per-channel symbols.

The LTE-A system is configured under the assumption that a large number of eNBs different in size are deployed within an area as compared to the conventional system. This increases interference per unit square such that the PDCCH designed for preventing inter-cell interface fails mitigating interference and is influenced by more interference from neighbor cells, resulting in reduction of UE coverage.

Furthermore, the eNB adopting a Multi-User Multiple Input Multiple Output (MU-MIMO) technique for scheduling more UEs and maximizing the system throughput lacks the control channel amount while having a large enough data channel amount, resulting in scheduling failure. In order to overcome this problem, there is a need to study the transmitting control channel using the dedicated reference signal on the legacy data channel. In transmitting the control channel on the data channel, it is possible to avoid inter-cell interference and utilize the dedicated reference signal and, as a consequence, multiple antennas can be used to transmit the control channel for multiple UEs on the same resource, resulting in maximization of the control channel capacity.

Figure 2:
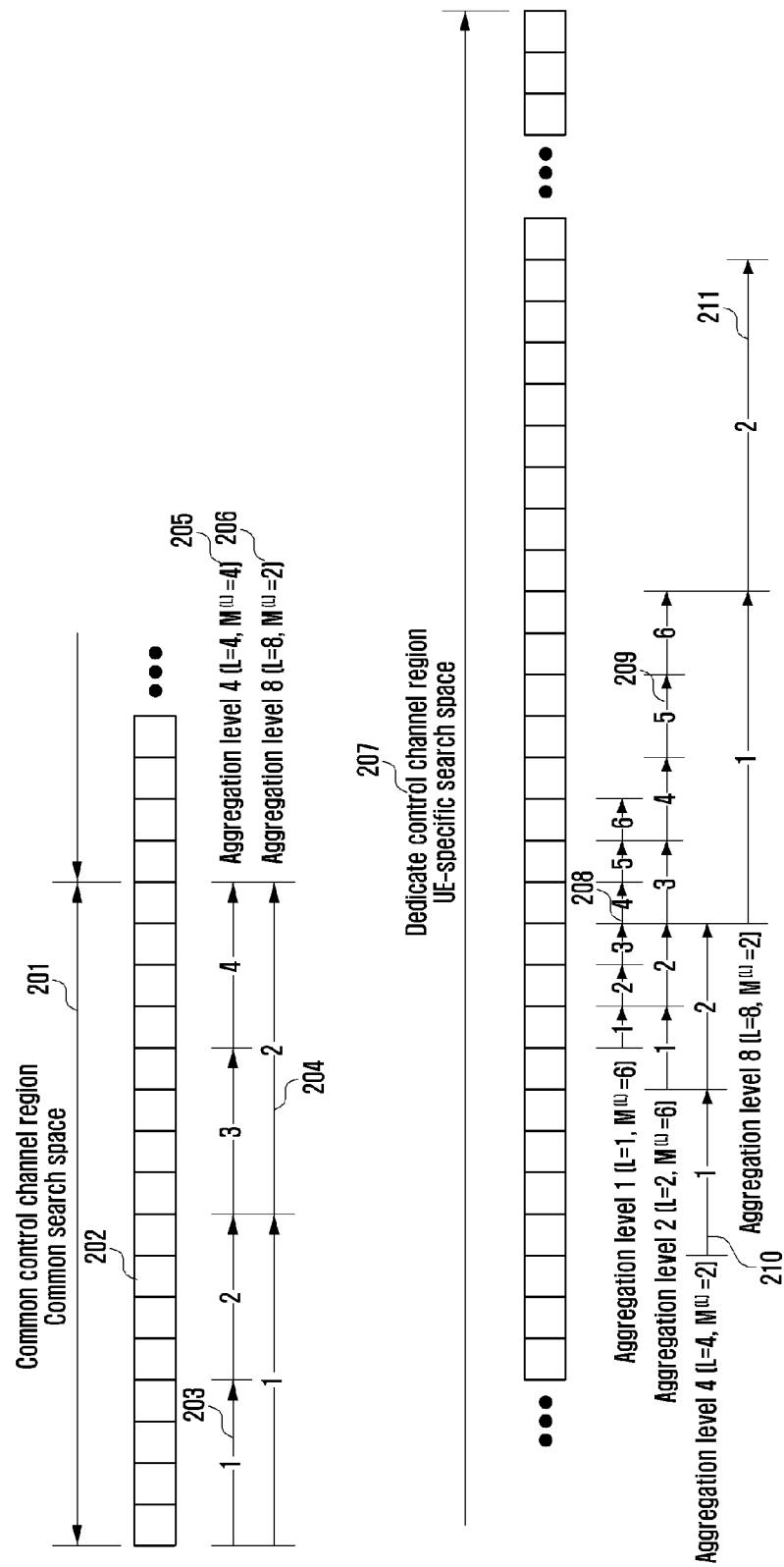
FIG. 2 illustrates a configuration of the control channel for use in the LTE system according to the present invention.

FIG. 2 illustrates a configuration of the control channel for use in the LTE system according to the present invention.

The LTE control channel is divided into a Common Control Channel Region 201 and a Dedicated Control Channel Region 207. The common control region is the region on which the control channel demodulation is always attempted, and the dedicated control channel region is divided into UE-specific parts on which the control channel demodulation is attempted by respective UEs.

In FIG. 2, reference number 202 denotes a CCE as a unit for transmitting control channel. The common control channel is composed of 16 CCEs while the remaining CCEs are used for the dedicated control channel region. In the LTE system, the control channel is not fixed in code rate, and its information amount to the resource is determined using a unit referred to as an aggregation level.

The available aggregation levels are 4 and 8 for the common reference signal and 1, 2, 4, and 8 for the dedicated reference signal. The unit of aggregation is CCE. Reference number 203 denotes a blind demodulation zone in the common control channel region according to the aggregation level. For available aggregation level 4, a total 4 blind demodulation zones can be transmitted as denoted by reference number 203; while for available aggregation level 8, a total 2 blind demodulation zones can be transmitted as denoted by reference number 204. Accordingly, the eNB can transmit the common control channel using 6 blind demodulation zones.

In the UE-specific control channel, the number of decoding iterations differs according to the aggregation level. For levels 1 and 2, a total 6 blind demodulation zones are possible, respectively, as denoted by reference numbers 208 and 209, while for levels 4 and 8, a total 2 blind demodulation zones are possible, respectively, as denoted by reference numbers 210 and 211. The blind demodulation can be performed to the same or different CCEs according to the aggregation level, as summed up in Table 1 which shows configurations of a control channel search space.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The CCEs to be used are determined according to Equation (1), shown below, where L denotes aggregation level and $N_{CC,K}$ the total number of CCEs of $k^{th}$ subframe. A CCE index for blind decoding is derived from Equation (1). $Y_k$ denotes a random variable for distributing user-specific control channels across the entire control channel region to avoid collision among the control channels and changes at every subframe by Equation (2), shown below. However, for common control channel, $Y_k$ is set to 0 in order for all of the UE to receive the signals on the same regions. The start of the $Y_k$ is a UE ID, A is 39827, and D is 65537.

$$L \cdot \{(Y_k+m) \bmod \lfloor N_{CCE,k}/L \rfloor\}+i, \ m=0,\ldots,M^{(L)}-1, \ i=0,\\ \ldots,L-1 \quad (1)$$

$$Y_k=(A \cdot Y_{k-1}) \bmod D \quad (2)$$

Figure 3:
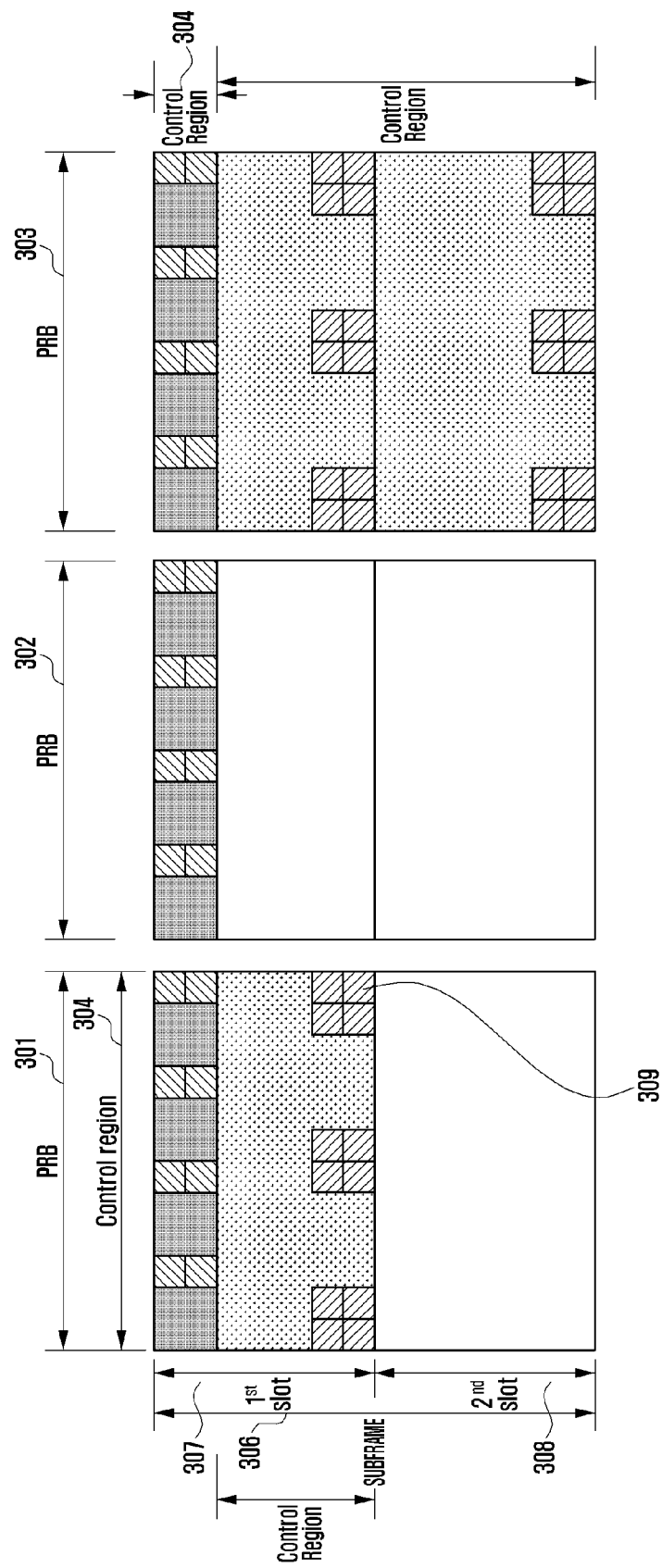
FIG. 3 illustrates a basic structure of the control channel with dedicated reference signal according to the present invention.

FIG. 3 illustrates a basic structure of the control channel with dedicated reference signal according to the present invention.

Referring to FIG. 3, the dedicated reference signal denoted by reference number 309 is transmitted in the data channel region. In FIG. 3, in PRB 301, the DRS is transmitted at the data channel region of the first slot 307 while, in PRB 303, the DRS is transmitted at the data channel region of both the first and second slots 307 and 308. This depends on the transmission of the dedicated control region, which may be transmitted at some symbols in time domain or some slots as denoted by reference number 301 of FIG. 3, or over the entire PRB as denoted by reference number 303. However, the dedicated control channel should always be transmitted in a specific PRB in the frequency domain.

FIG. 3 is directed to when the dedicated control channel is transmitted in the PRB 301 and at the first slot 307. Since the LTE system is configured such that the control channel is received on the PDCCH, the legacy UE cannot receive the control channel with the dedicated reference signal as shown in FIG. 3. There is therefore a need to configure a new control channel region.

As described above, the common control channel and UE-specific control channel have to be transmitted with the DRS. In this case, the eNB may perform resource allocation with different resources or different search spaces for the dedicated control channel. For the common control channel, the eNB has to transmit the control channel such that all of the UEs may receive the control channel with the DRS. The legacy control channel is transmitted on the same control channel resource for every UE such that, if the common control channel region is arranged as a logical resource as denoted by reference number 201 of FIG. 2, the UEs receive the signal on the same resource.

Since the 16 resources from the start point of the logical resource region are used, the common control channel is transmitted at the same location. Accordingly, although it fails access to a cell to receive the system information, the UE can maintain the common control channel region and thus receive the common control channel in the corresponding region without system information or other higher layer signaling.

In the control channel with DRS, however, it is required to notify the UE of the control channel region through higher layer signaling. Accordingly, in order to receive the common control channel without higher layer signaling, the UE has to determine the resource region, and an embodiment of the present invention discloses a method for configuring the resource region for receiving common control channel with the DRS without extra signaling or system information at the initial attach operation. With this method, it is possible to expect the inter-cell resource distribution effect for distributing interference among the control channels of the multiple cells, and the UE can receive the common control channel in an incompatible frequency band on which the us cannot attempt initial attachment.

Figure 4:
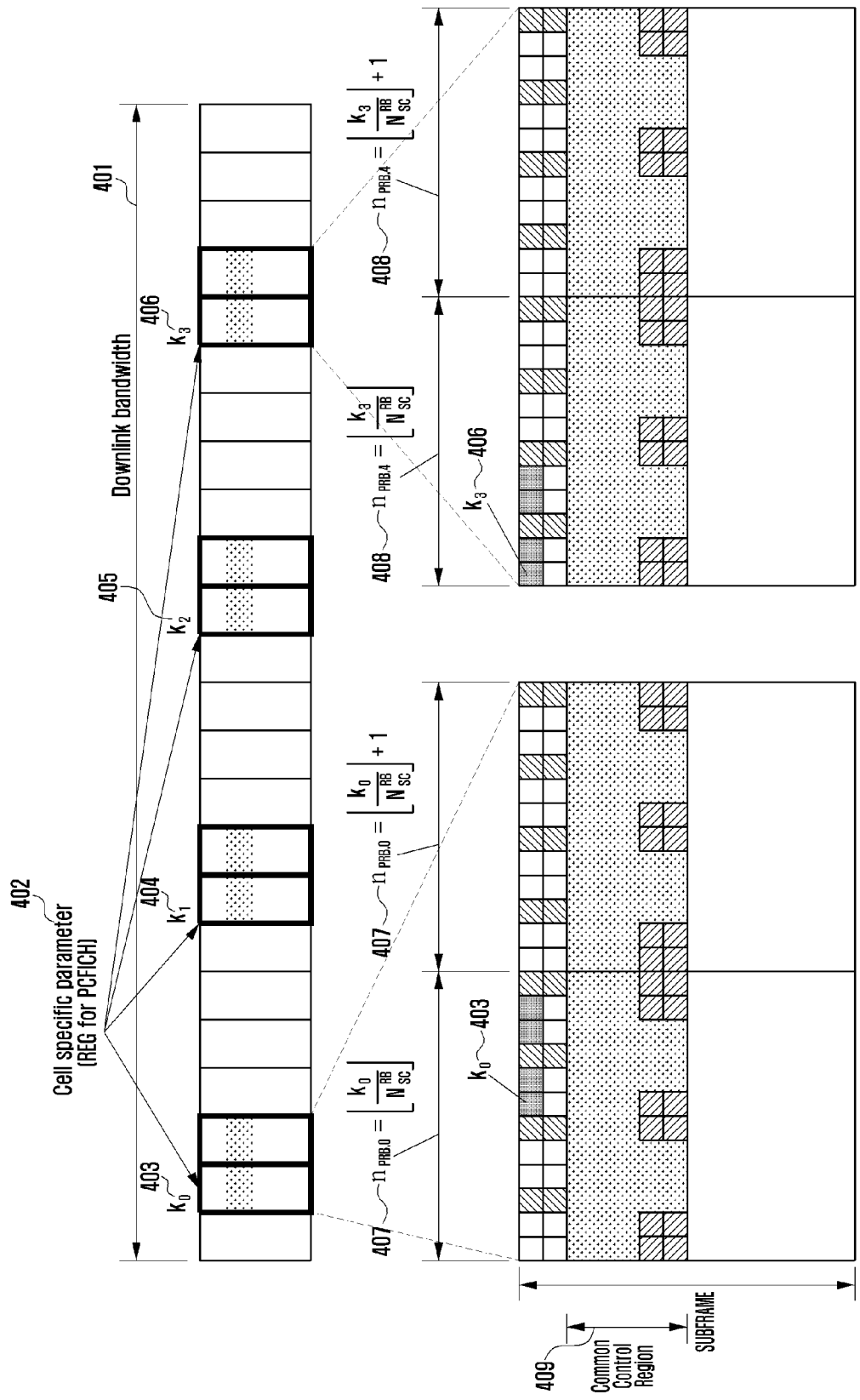
FIG. 4 illustrates a configuration of the common control channel with DRS for use in the resource allocation method according to the present invention.

FIG. 4 illustrates a configuration of the common control channel with DRS for use in the resource allocation method according to the present invention.

Referring to FIG. 4, the common control channel with the dedicated control signal is transmitted in the PRB having REG of PCFICH for indicating the size of the control channel with the common reference signal. The PCFICH carries the information about the size of the control channel with the common reference signal. In the initial attachment to the cell, the UE receives a Master Information Block (MIB) through a Physical Broadcast CHannel (PBCH) after acquiring synchronization.

In order to acquire the system information transmitted in the System Information Block (SIB), the UE receives the information on Physical HARQ Indicator Channel (PHICH) and PCFICH, receives the PDCCH based on the information contained in the PCFICH, and receives the SIB in a Physical Downlink Shared Channel (PDSCH) using the information contained in the PDCCH. In order to transmit an extended Physical Downlink Control Channel prior to SIB transmission, the eNB has to send the UE the information on the ePDCCH in the MIB.

To modify the MIB may influence the reception at the legacy UEs, and ePDCCH information is too large to be included in the MIB. Also, the UE has to be configured so as to receive the ePDCCH regardless of the PDCCH. If it is necessary to transmit the PDCCH for ePDCCH transmission, the resource shortage problem worsens. Furthermore, the eNB has to transmit the PCFICH for PDSCH transmission. Accordingly, in order to send the ePDCCH to the UE without extra information, it is necessary to define a resource allocation rule for PCFICH and ePDCCH resources. The PCFICH is configured with 4 REGs distributed regularly across the system bandwidth.

Assuming that the index of the first RE of the 4 REGs is k, the 4 REGs are mapped to the resources k0, ki1, k2, and kl3 as denoted by reference number 403, 404, 405, and 406; and when transmitting the common control channel on the ePDCCH, the common control channel is mapped in the PRB including k0, k1, k2, and k3. That is, an embodiment of the present invention discloses a method for allocating the common control channel in the PRB including k0, k1, k2, and k3 when the common control channel is transmitted on the ePDCCH. When the resource amount of the common control channel is 16 CCEs and the ePDCCH is transmitted at the first slot as denoted by reference number 409 of FIG. 4, it is assumed that the resource allocation is performed in units of multiples of 4 at $1^{st}$/1PRB. When using 8 PRBs, the PRB index used for common control channel of the ePDCCH is shown in Equation (4) as $$n_{PRB,1} = \left\lfloor \frac{k_o}{N_{sc}^{RB}} \right\rfloor + n; \quad (4)$$

where $o = 0, \ldots, O$ and where $n = 0, \ldots, N$ where O and N are 4 and 1 respectively. In this case, the index of the PRB carrying the ePDCCH common control channel is $$n_{PRB,0} = \left\lfloor \frac{k_o}{N_{sc}^{RB}} \right\rfloor,$$

$$n_{PRB,1} = \left\lfloor \frac{k_o}{N_{sc}^{RB}} \right\rfloor + 1,$$

$$n_{PRB,2} = \left\lfloor \frac{k_1}{N_{sc}^{RB}} \right\rfloor,$$

$$n_{PRB,3} = \left\lfloor \frac{k_1}{N_{sc}^{RB}} \right\rfloor + 1,$$

$$n_{PRB,4} = \left\lfloor \frac{k_2}{N_{sc}^{RB}} \right\rfloor \text{ and}$$

$$n_{PRB,5} = \left\lfloor \frac{k_2}{N_{sc}^{RB}} \right\rfloor + 1,$$

$$n_{PRB,6} = \left\lfloor \frac{k_3}{N_{sc}^{RB}} \right\rfloor,$$

$$n_{PRB,7} = \left\lfloor \frac{k_3}{N_{sc}^{RB}} \right\rfloor + 1.$$

This indicates that the PRB resources as much as a multiple of 4, judged by 4 PRBs carrying the PCFICH, are used for transmitting control channel of the ePDCCH. In this manner, the UE can receive the ePDCCH immediately after the receipt of PCFICH and determines the resource without extra signaling. For the same reason that each cell transmits the PCFICH REG at a fixed location to mitigate interference, it is preferred to transmit the ePDCCH at a fixed location to mitigate interference. The ePDCCH is not transmitted on the resource allocated for Primary Synchronizaiton Singal (PSS), Secondary Synchronization Singal (SSS), and PBCH.

The location of the PCFICH REG is determined based on the cell ID of the eNB, and an embodiment of the present invention includes determining the location of the common control channel PRB based on the cell ID. However, relating to the PCFICH REG is for the UE to receive control channel without extra PRB location computation with the exception of the PRB location computation for receiving the PCFICH. The control channel structure for first slot transmission as shown in FIG. 4 is advantageous to quickly modulate the control channel. In ePDCCH, the data channel is received simultaneously with the ePDCCH so as to facilitate data channel demodulations with the receipt of the ePDCCH and facilitate demodulation of the data channel.

Figure 5:
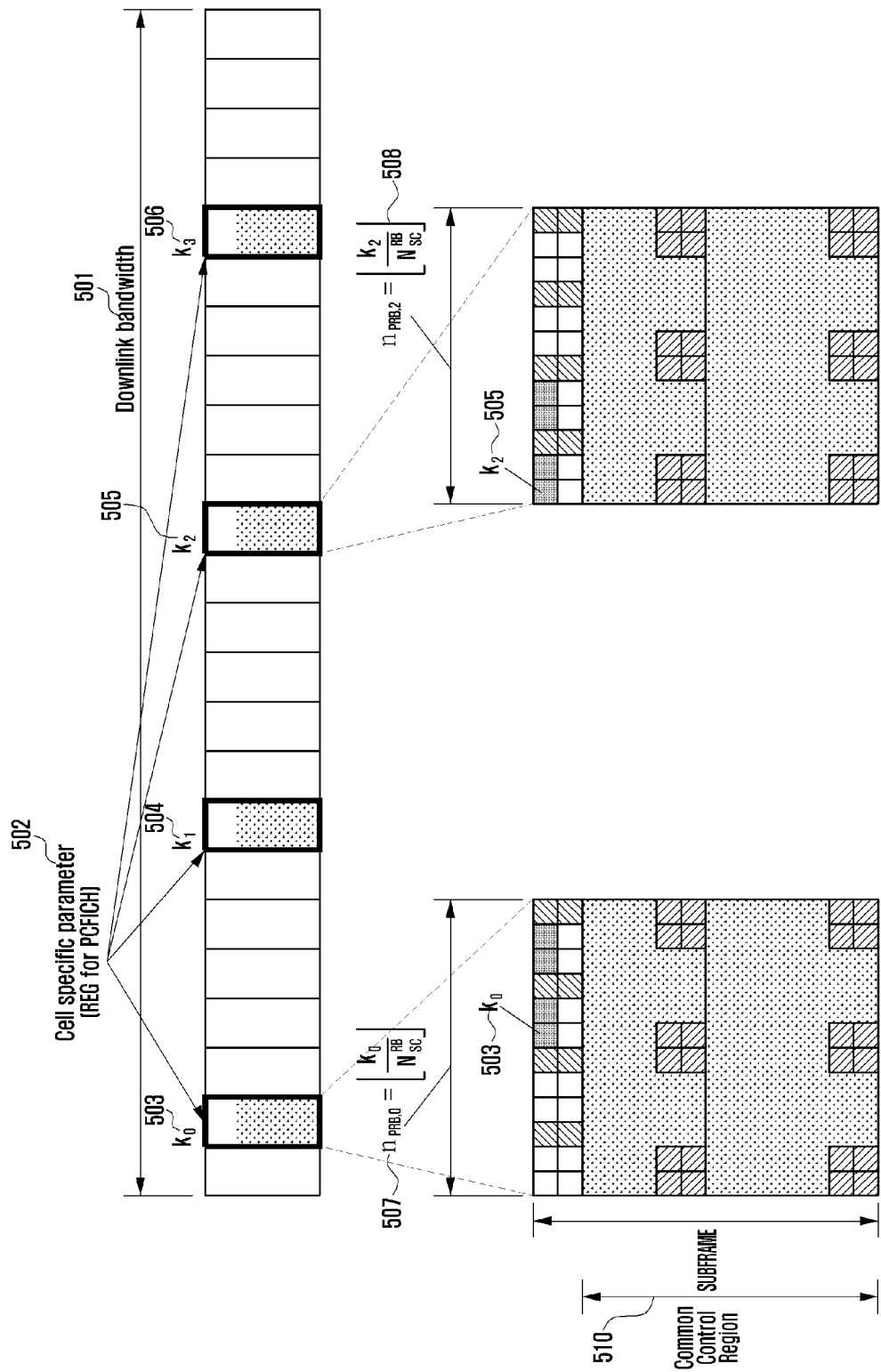
FIG. 5 illustrates a control channel configuration for extending ePDCCH time duration to the second slot in the resource allocation method according to the present invention.

FIG. 5 illustrates a control channel configuration for extending the ePDCCH time duration to the second slot in the resource allocation method according to the present invention.

Referring to FIG. 5, the resource for carrying the common control channel is shown in Equation (5) as $$n_{PRB,1} = \left\lfloor \frac{k_o}{N_{sc}^{RB}} \right\rfloor + n; \quad (5)$$

where $o = 0, \ldots, O$ and where $n = 0, \ldots, N$ |

(where O=4 and N=0), and the indices of the PRBs mapped to the resource are $$n_{PRB,0} = \left\lfloor \frac{k_0}{N_{SC}^{RB}} \right\rfloor,$$

$$n_{PRB,2} = \left\lfloor \frac{k_1}{N_{SC}^{RB}} \right\rfloor,$$

$$n_{PRB,4} = \left\lfloor \frac{k_2}{N_{SC}^{RB}} \right\rfloor, \text{ and}$$

$$n_{PRB,6} = \left\lfloor \frac{k_3}{N_{SC}^{RB}} \right\rfloor.$$

If the ePDCCH transmission duration is extended to the second slot as shown in FIG. 5, the decoding time elongates as compared to when the first slot is used. However, using the entire subframe for control channel transmission, it is possible to transmit the dedicated reference signal of the common control region 510 across, the first and second slots and to give the effect of spatial multiplexing in the PRB region, resulting in improvement of channel estimation and resource utilization efficiencies. It is possible to adopt spatial multiplexing even when using the first slot. In this case, however, the second slot may carry the data for other UEs so as to restrict the multiplexing efficiency. Accordingly, it is advantageous to transmit the control channel across the entire PRB in view of the spatial multiplexing efficiency.

FIGS. 4 and 5 illustrate the resource arrangements for the eNB to transmit the PDCCH and ePDCCH simultaneously. The start time of the ePDCCH is determined by L in the PCFICH. In the incompatible carrier carrying not PDCCH which is considered in LTE-A, ePDCCH may be transmitted in the first symbol at the beginning of a subframe.

Figure 6:
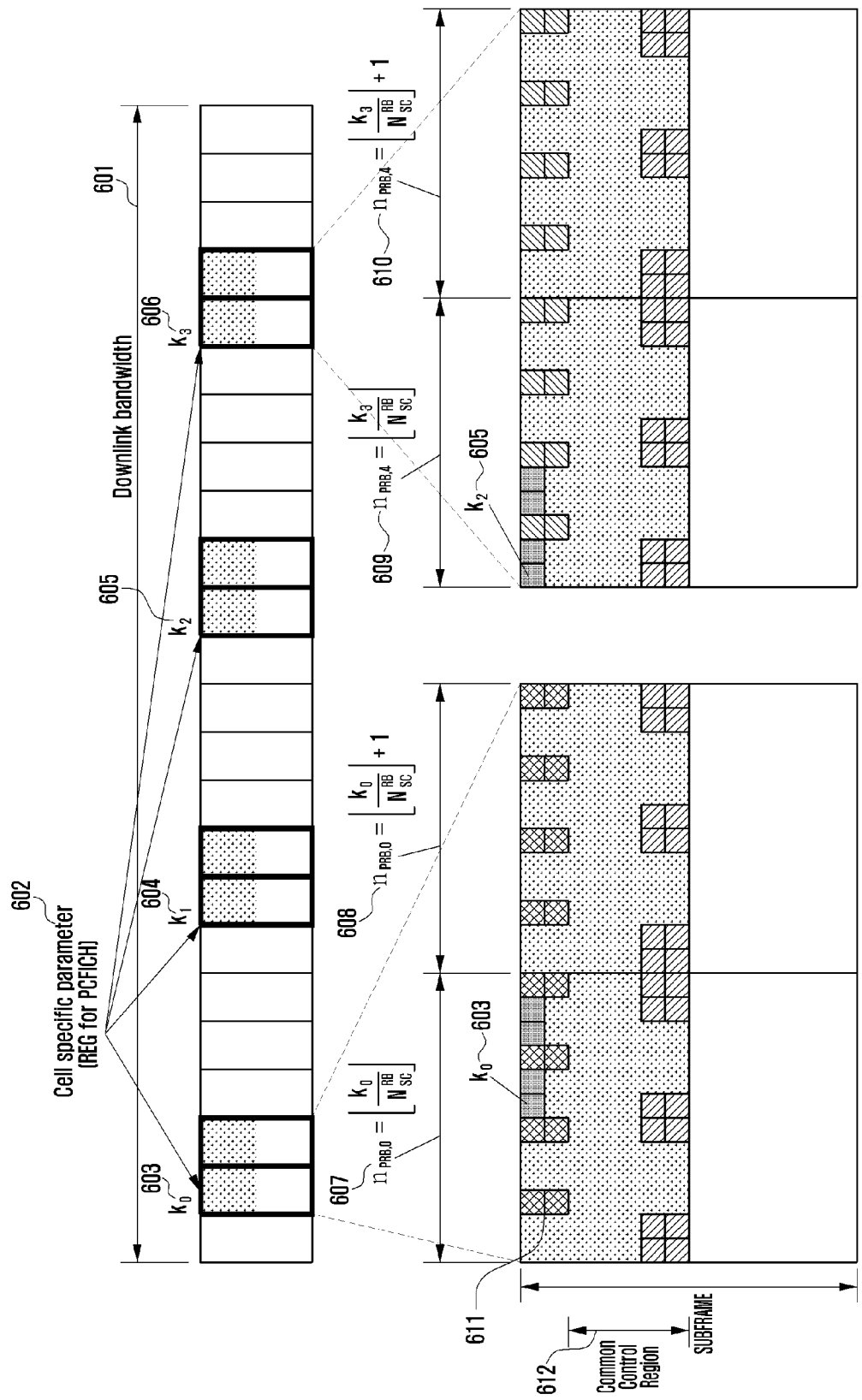
FIG. 6 illustrates a control channel configuration for transmitting ePDCCH on non-backward compatible carrier in the resource allocation method according to the present invention.

FIG. 6 illustrates a control channel configuration for transmitting the ePDCCH on a non-backward compatible carrier in the resource allocation method according to the present invention.

Referring to FIG. 6, since the non-backward compatible carrier may have no PDCCH transmission, the ePDCCH resource can be allocated from the first symbol at the beginning of the subcarrier as denoted by reference number 612. In the non-backward compatible carrier having no PDCCH transmission, the CRS is not needed, and the new control channel is received with a legacy DRS such that, when the DRS is arranged at the forepart of the subframe in the time domain, its location is at the rear part of the slot. In this case, the channel estimation is delayed such that an additional DRS may be transmitted at the positions where the legacy CRS is transmitted as denoted by reference number 611. The DRS is arranged at the same location with CRS as denoted by reference number 611 so as to maintain the resource allocation scheme when the PCFICH and the PHICH, with the exception of the PDCCH, are transmitted in the conventional structure.

Figure 7:
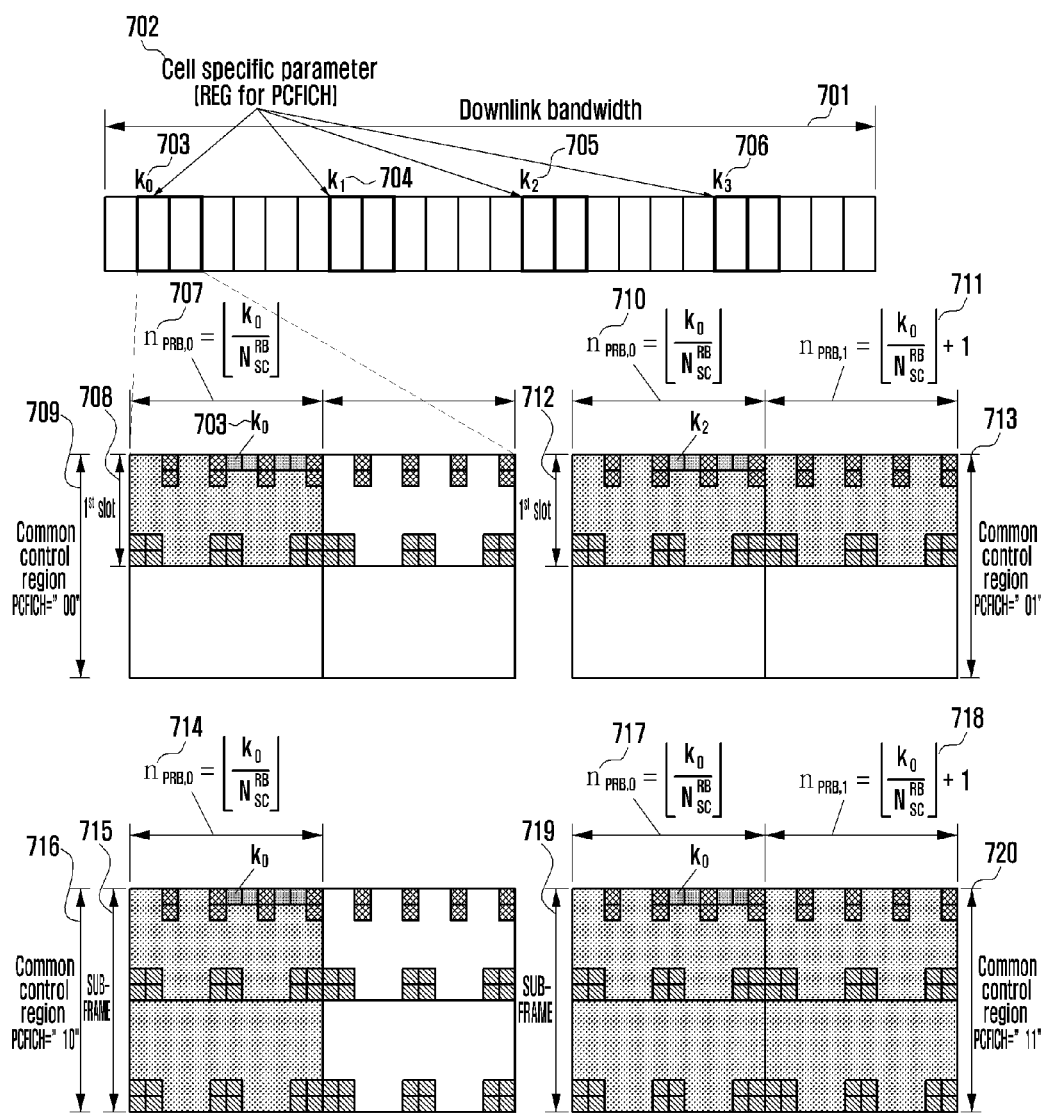
FIG. 7 illustrates a control channel configuration for indicating the resource amount in common control channel resource allocation with DRS according to the present invention.

FIG. 7 illustrates a control channel configuration for indicating the resource amount in the common control channel resource allocation with DRS according to the present invention.

FIG. 7, it is assumed the carrier carrying the control channel with the DRS does not carry the PDCCH, although it is backward-compatible, according to an embodiment of the present invention. Also, it is assumed that the non-backward compatible carrier carries the PCFICH. In this case, it is not needed for the PCFICH to indicate the CFI value which cannot be used for other purposes. The common control channel is configured to use 16 CCEs regardless of the real control channel transmission amount and may be shared when the UE-specific control channel region is lacking.

When using the DRS, the value may be changed depending on the actual transmission amount and spatial multiplexing transmission scheme. The common control channel changes at every subframe, and resource efficiency degradation may occur when using the same fixed resource. In an embodiment of the present invention, CFI of PCFICH indicates the resource amount of the DRS. The PCFICH is 2 bits and is interpreted as shown in Table 2 below. The order of the interpretations of the information bits may be changed. In this embodiment of the present invention, the resource is indicated by the PRB index determined in the previous embodiment.

TABLE 2

| Information for PCFICH | Time | Frequency |
|---|---|---|
| 00 | 1$^{st}$ slot | 1PRB |
| 01 | 1$^{st}$ slot | 2PRB |
| 10 | 1$^{st}$ and 2$^{nd}$ slot | 1PRB |
| 11 | 1$^{st}$ and 2$^{nd}$ slot | 2PRB |

Figure 8:
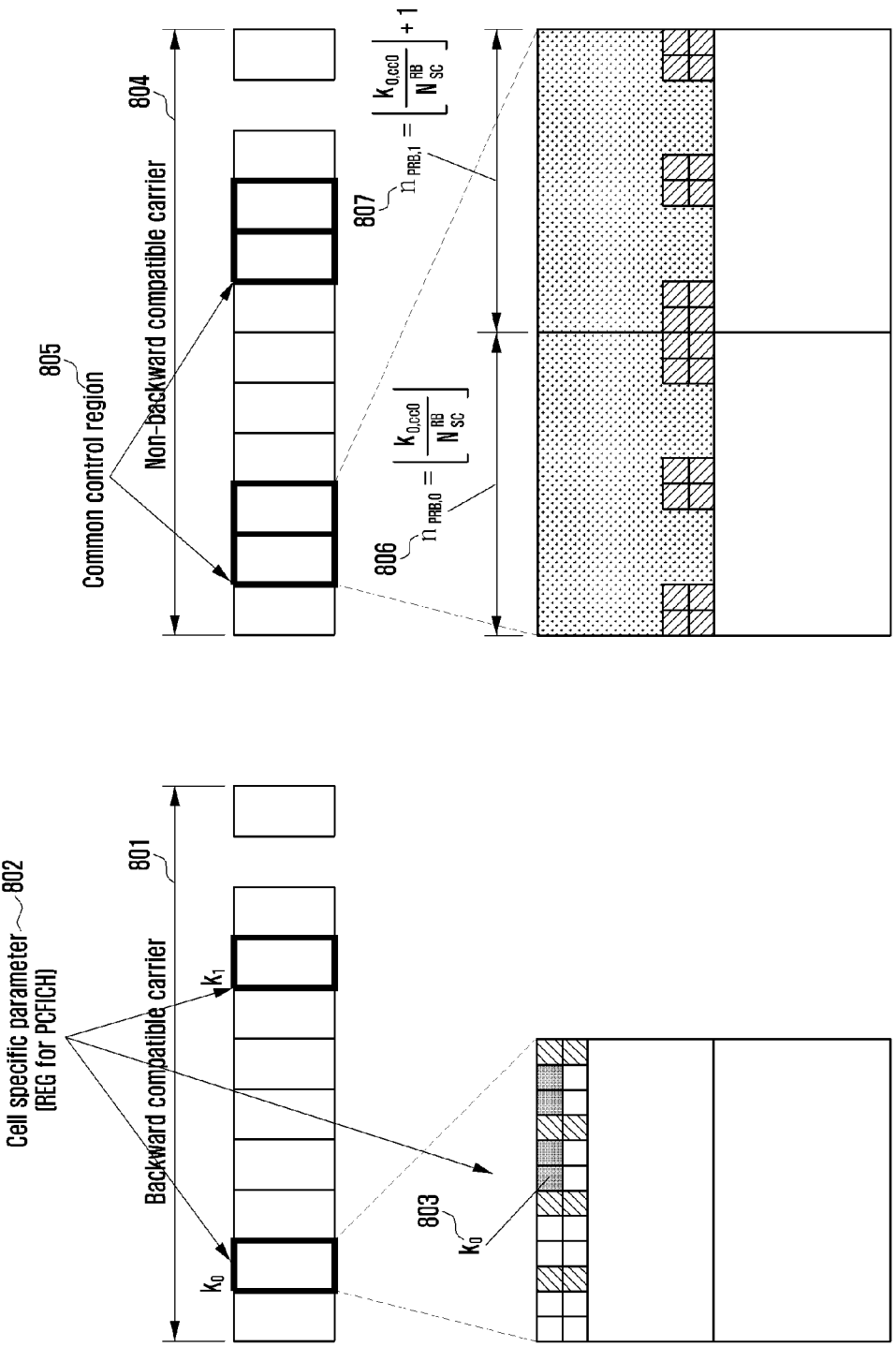
FIG. 8 illustrates a principle of resource allocation for common control channel in the resource allocation method according to the present invention.

FIG. 8 illustrates a principle of resource allocation for the common control channel in the resource allocation method according to the present invention.

The embodiment shown in FIG. 8 discloses a method for determining, when the eNB operating with two or more carriers, an index of the location of the common control channel region carried on the non-backward compatible carrier according to the PRB including the PCFICH REG and transmitting the index on the non-backward compatible carrier. That is, the resource allocation for the common control channel region on the non-backward carrier is determined based on the location k of the PCFICH REG of the backward compatible carrier linked to the non-backward compatible carrier as denoted by reference number 802 of FIG. 8, and the common control channel is allocated as denoted by reference number 805 based on the PRB resource index determined as denoted by reference numbers 806 and 807.

Figure 9:
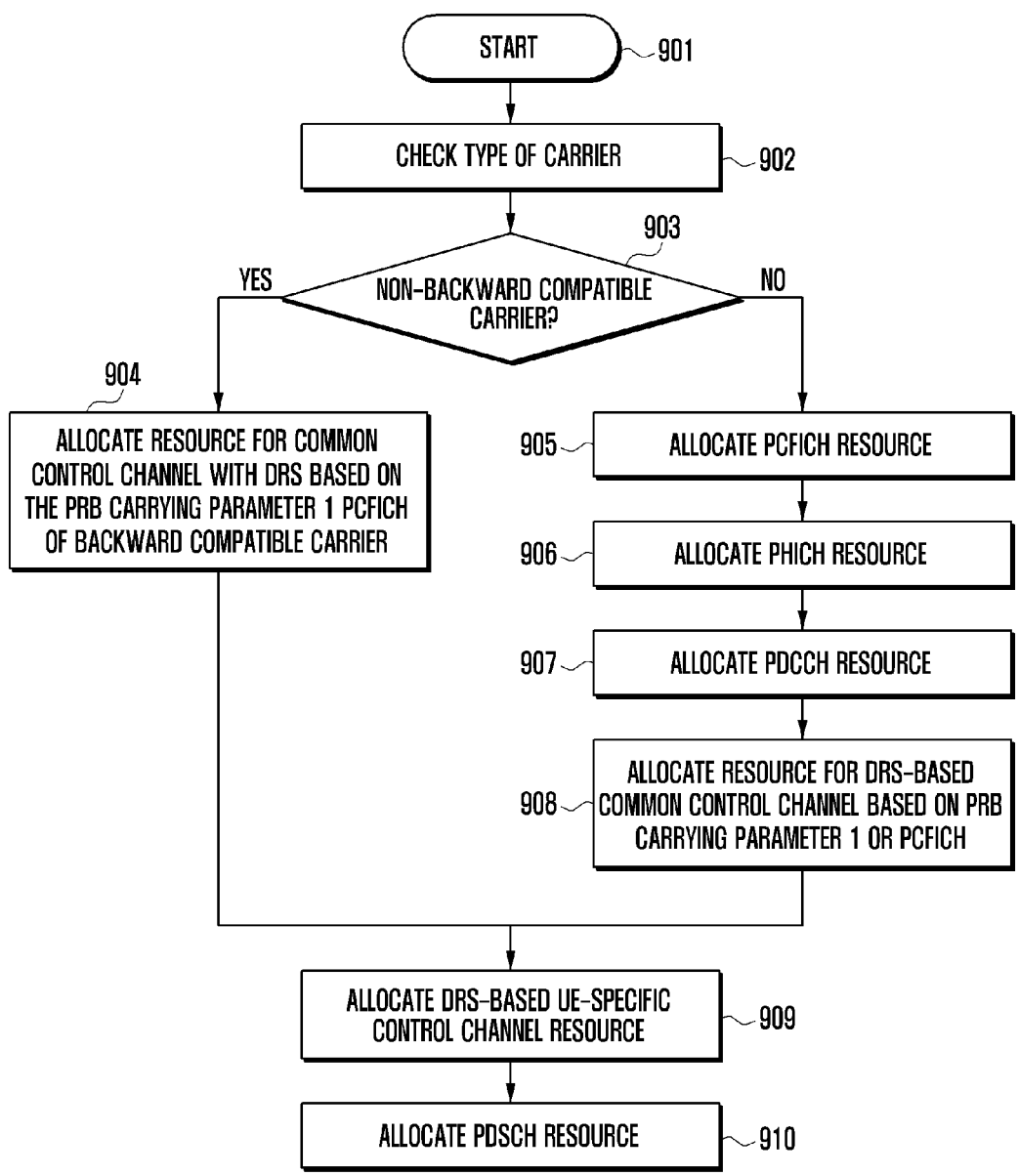
FIG. 9 illustrates a method for an eNB to allocate channels according to the present invention.

FIG. 9 illustrates a method for an eNB to allocate channels according to the present invention.

Referring to FIG. 9, the eNB determines the type of the carrier for control channel transmission at step 902. The carrier can be a backward compatible carrier or non-backward compatible carrier. The eNB determines whether the carrier is the non-backward compatible carrier at step 903 and, if the carrier is the non-backward compatible carrier, allocates DRS-based common control channel based on a parameter of the backward compatible carrier. The parameter is the index of the PRB including the REG to which the PCFICH of the backward compatible carrier is mapped and also indicates the PRB index derived based on the cell ID.

When the eNB operates on two or more carriers according to the embodiment of the present invention as shown in FIG. 3, the location of the common control channel region transmitted on the non-backward compatible carrier is determined based on the index of the PRB including the REG to which the PCFICH of the backward compatible carrier is mapped, and the actual transmission is performed with the corresponding index of the non-backward compatible carrier.

If it is determined at step 903 that the carrier is the backward compatible carrier, the eNB allocates resources for the PCFICH to inform of a number of OFDM symbols for the control channel at step 905, allocates resources for the PHICH as the channel carrying Hybrid Automatic Repeat reQuest (HARQ) Indicator (HI) at step 906, and allocates resources for the PDCCH at step 907. Step 907 may be omitted.

The eNB allocates resources for the DRS-based common control channel at the location determined based on the index of the PRB including resources to which the PCFICH is mapped at step 908. The determined location indicates the slot size in the time domain and number of consecutive PRBs in the frequency domain as described with reference to FIGS. 4 to 6. After allocating resources for the DRS-based common control channel at step 904 or 908, the eNB allocates resources for the DRS-based UE-specific control channel at step 909 and allocates resources for PDSCH based on the scheduling information at step 910.

Figure 10:
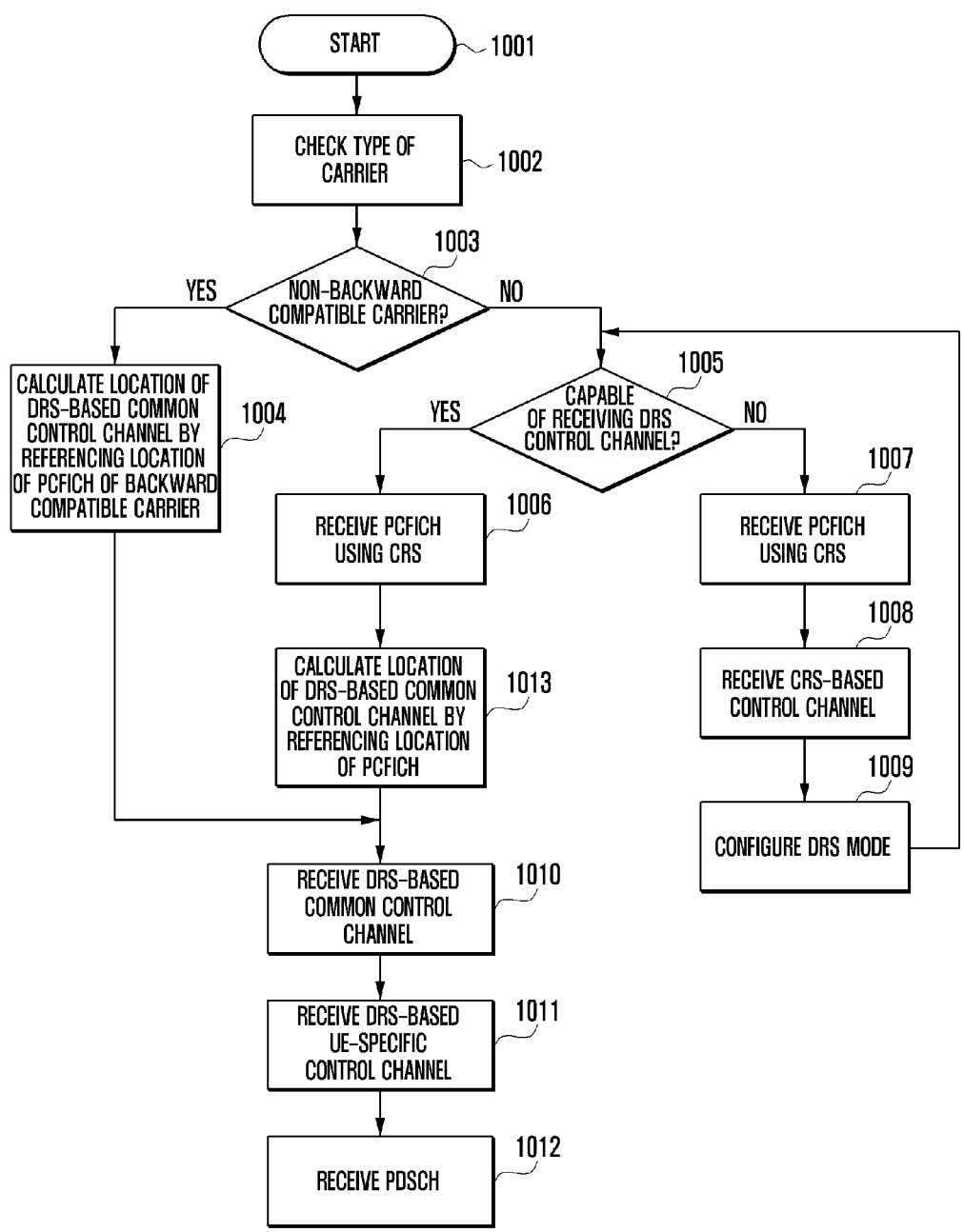
FIG. 10 illustrates a method for a UE to receive the channel transmitted by the eNB according to the present invention.

FIG. 10 illustrates a method for a UE to receive the channel transmitted by the eNB according to the present invention.

Referring to FIG. 10, the UE receives a control channel transmitted by the eNB at step 1001 and determines the type of carrier on which the control channel has been transmitted at step 1002. The UE determines whether the carrier is the non-backward compatible carrier at step 1003 and, if the carrier is the non-backward compatible carrier, calculates the location of the DRS-based common control channel based on the location of the REG to which the PCFICH is mapped on the backward compatible carrier at step 1004. The UE receives the DRS-based common control channel at step 1010, the DRS-based UE-specific control channel at step 1011, and the PDSCH at step 1012.

If it is determined that the carrier is the backward compatible carrier at step 1003, the UE determines whether it is possible to receive the DRS-based control channel currently at step 1005. If it is possible to receive the DRS-based control channel, the UE receives PCFICH based on the CRS at step 1006 and calculates the location of the DRS-based common control channel based on the location of the received PCFICH at step 1013. The UE receives the DRS-based common control channel at step 1010, the DRS-based UE-specific control channel at step 1011, and the PDSCH at step 1012.

Otherwise, if it is impossible to receive DRS-based control channel at step 1005, the UE receives the PCFICH based on the CRS at step 1007 and the CRS-based control channel at step 1008 and then configures the DRS mode to receive the transmission information on the DRS-based control channel at a higher layer at step 1009.

Figure 11:
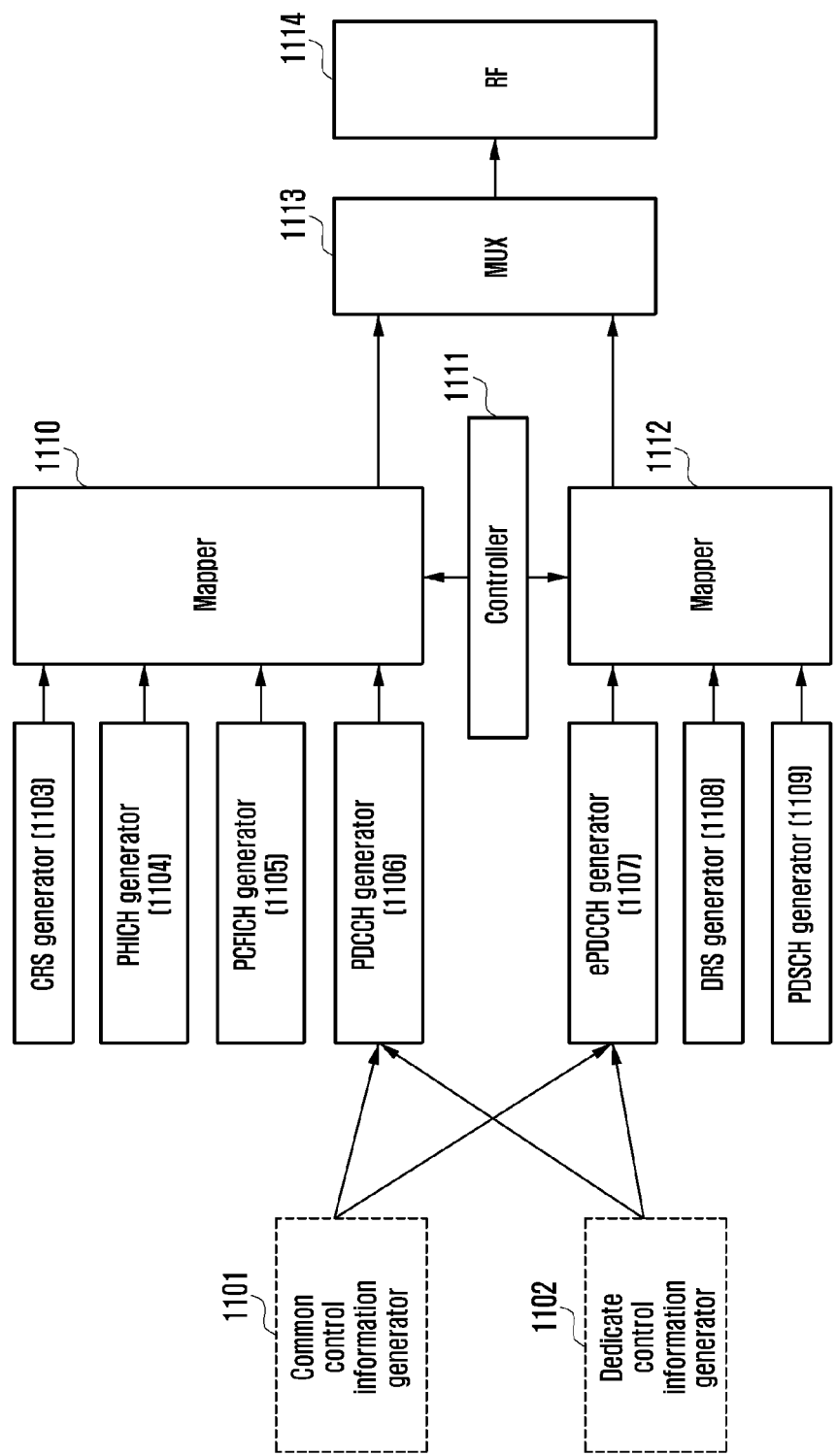
FIG. 11 illustrates a configuration of the transmitter of the eNB according to the present invention.

FIG. 11 illustrates a configuration of the transmitter of the eNB according to the present invention.

Referring to FIG. 11, the common control information generator 1101 generates common control information to be transmitted to the UE, and the dedicated control information generator 1102 generates dedicated control information to be transmitted to the UE. The CRS generator 1103 generates a common reference signal, and the DRS generator 1108 generates dedicated reference signals. The PHICH generator 1104 generates a physical HARQ indicator channel carrying a hybrid Automatic Repeat Request Indicator, and the PCFICH generator 1105 generates a Physical Control Format indicator channel carrying Control Format Indicator (CFI). The PDCCH generator 1106 and ePDCCH generator 1107 generate physical channels carrying downlink control channel information, and the PDSCH generator 1109 generates a physical channel carrying downlink data.

The controller 1111 controls downlink control channel resource allocation for transmitting channel information according to the present invention. A detailed description on the operation of the controller 1111 will be given later. The mapper 1110 maps CRS, PHICH, PCFICH, and PDCCH information to the corresponding resources under the control of the controller 1111; and the mapper 1112 maps DRS, ePDCCH, and PDSCH information to the corresponding resources under the control of the controller 1111. The multiplexer (MUX) 1113 multiplexes the channel information output by the mappers 1110 and 1112, and the Radio Frequency (RF) unit 1114 converts the multiplexed channel information to an RF signal.

The common control information and dedicated control information are configured into the CRS-based PDCCH through the PDCCH generator 1106 and simultaneously the DRS-based ePDCCH through the ePDCCH generator 1107 under the control of the controller 1111. That is, the controller 1111 determines the UE capability of receiving channel status and a control channel to determine the real control channel mapping and transmit the common control information and dedicated control information through the determined channel. When multiple UEs are connected to the eNB, the PDCCH and the ePDCCH may be simultaneously transmitted at a subframe or separately transmitted at two subframes.

In a CRS-based common control channel, the controller 1111 maps the channels generated by the CRS generator 1103, PHICH generator 1104, PCFICH generator 1105, and PDCCH generator 1106 to the corresponding resources in the control channel region by means of the mapper 1110.

In an ePDCCH, the controller 1111 maps the ePDCCH generated by the ePDCCH generator 1107, the DRS generated by the DRS generator 1108, and data generated by the PDSCH generator 1109 to corresponding resources by means of the mapper 1112. When the ePDCCH is transmitted, the controller 1111 may transmit some or all output of the CRS generator 1103, PHICH generator 1104, PCFICH generator 1105, and PDCCH generator 1106.

In a channel configuration procedure according to the present invention, the controller 1111 determines the type of the carrier for carrying the control channel. The carrier can be the backward compatible carrier or non-backward compatible carrier. In the non-backward compatible carrier, the controller 1111 assigns the DRS-based common control channel generated by the DRS generator 1108 based on the parameter of the backward compatible carrier, which is the index of the PRB including the REG to which the PCFICH of the backward compatible carrier is mapped.

In the backward compatible carrier, the controller 1111 assigns the PCFICH generator 1105, PHICH generator 1104, and PDCCH generator 1106, among which the PDCCH generator 1106 may be omitted. The controller 1111 maps the DRS-based common control channel generated by the DRS generator 1108 to the location determined based on the index of the PRB including the resource to which PCFICH is mapped. After the DRS-based common control channel mapping, the controller maps the DRS-based UE-specific control channel and maps the PDSCH based on the scheduling information.

Figure 12:
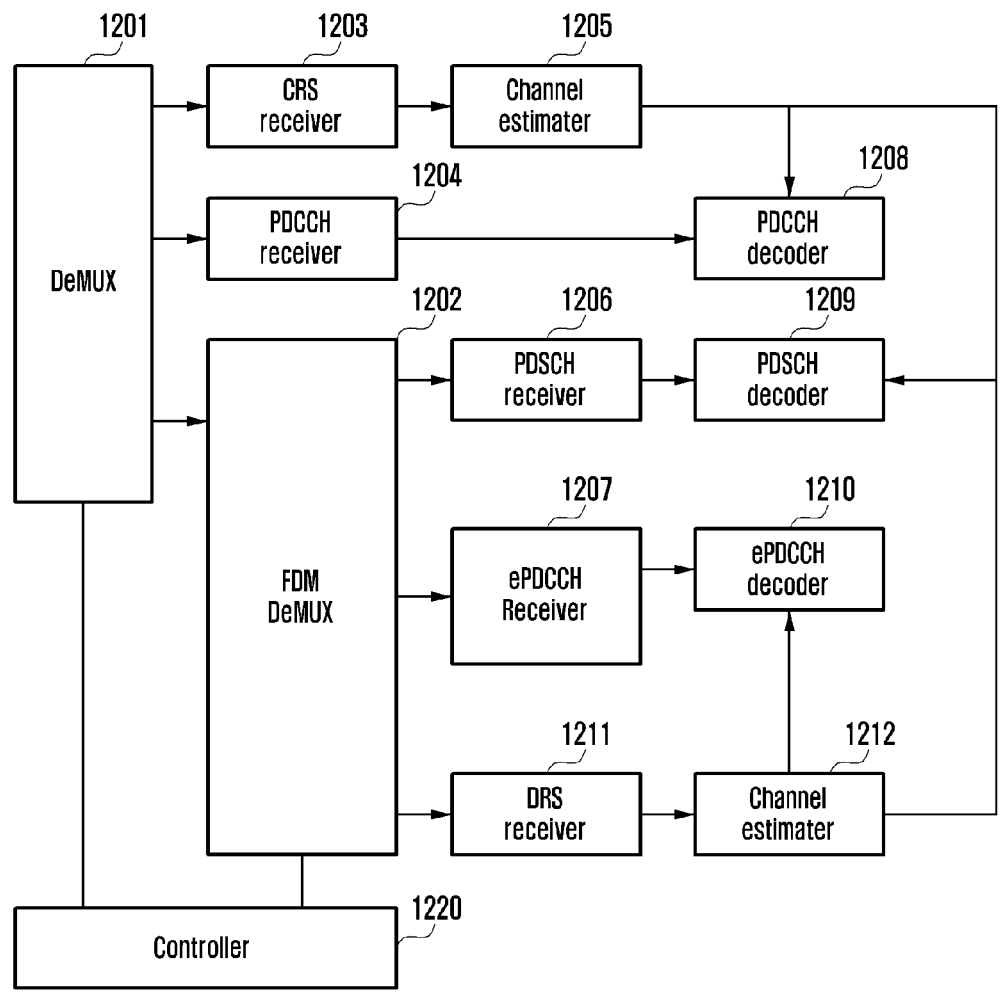
FIG. 12 illustrates a configuration of the receiver of the UE according to the present invention.

FIG. 12 illustrates a configuration of the receiver of the UE according to the present invention.

Referring to FIG. 12, the demultiplexer (DeMUX) 1201 demultiplexes the received signal. The CRS receiver 1203 receives the demultiplexed CRS. The channel estimator 1205 estimates a channel with the CRS. The PDCCH receiver 1204 receives the demultiplexed PDCCH information, and the PDCCH decoder 1208 compensates the channel according to the channel estimation result and decodes the received PDCCH information. The Frequency Division Multiplex (FDM) demultiplexer (DeMUX) 1202 demultiplexes the frequency division multiplexed signals output by the demultiplexer 1201.

The PDSCH receiver 1206 receives the FDM-demultiplexed PDSCH data, the ePDCCH receiver 1207 receives the FDM-demultiplexed ePDCCH information, and the DRS receiver 1211 receives the FDM-demultiplexed DRS information. The channel estimator 1212 estimates the channel with DRS. The PDSCH decoder 1209 compensates the channel according to the channel estimation result of the channel estimator 1205 and decodes the PDSCH data. The ePDCCH decoder 1210 compensates the channel according to the channel estimation result of the channel estimator 1212 and decodes the received ePDCCH information.

The controller 1220 analyzes the signals demultiplexed by the demultiplexers 1201 and 1202 to assign the signals to the corresponding channels. Although not depicted in FIG. 12, a demapper performs demapping on the demultiplexed signals under the control of the controller 1220, which determines the type of the carrier to receive the common control channel and dedicated control channel information.

That is, the controller 1220 determines the type of the carrier carrying the control channel transmitted by the eNB. If the carrier is the non-backward compatible carrier, the controller 1220 calculates the location of the DRS-based common control channel based on the location of the PCFICH mapped to the REG of the backward compatible carrier in the control channel region. The controller 1220 receives the DRS-based common control channel, the DRS-based UE-specific control channel, and the PDSCH in sequence.

If the carrier is the backward compatible carrier, the controller 1220 determines the UE capability of the DRS-based control channel reception and, if the UE has the capability, receives the CRS-based PCFICH and calculates the location of the DRS-based common control channel based on the location of the PCFICH. The controller 1220 receives the DRS-based common control channel, the DRS-based UE-specific control channel, and the PDSCH in sequence. If the UE has no DRS-based control channel reception capability, the controller 1220 configures the UE to receive the CRS-based PCFICH and CRS-based control channel and configures the UE to receive the DRS-based control channel at a higher layer.

Through the above procedure, the UE demultiplexes the signals by means of the demultiplexer 1201 in the time domain to output the multiplexed signals to the CRS receiver 1203 and PDCCH receiver 1204 such that the CRS is processed by the channel estimator 1205 and PDCCH demodulator so as to output control channel information. The signal separated by the demultiplexer 1201 is demultiplexed in the frequency domain through the frequency demultiplexer 1202, the output of the DRS receiver 1211 is applied to the ePDCCH receiver 1210 via the channel estimator 1212, and the signal output to the ePDCCH 1207 is decoded by the ePDCCH decoder 1210 to receive the ePDCCH with channel estimation information.

As described above, the method and apparatus for allocating resource of common control channel with the DRS according to the present invention enables a UE to receive the common control channel without extra signaling by mapping the common control channel to the frequency resource based on the cell-specific parameter or cell-specific channel. Also, the method and apparatus for allocating resource of the common control channel with the DRS according to the present invention is capable of transmitting common control channel on the non-backward compatible carrier, which has no conventional CRS-based control channel, by referencing the resource allocation on the backward compatible carrier.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A common control channel resource allocation method of a base station transmitter, comprising:
   determining a carrier type;
   allocating resources for a Physical Control Format Indicator CHannel (PCFICH), when the carrier is a backward compatible carrier; and
   allocating resources for a common control channel with a dedicated reference signal based on a Physical Resource Block (PRB) allocated for the PCFICH.

2. The common control channel resource allocation method of claim 1, wherein allocating the resources for a common control channel comprises assigning the common control channel resources in a first slot following a consecutive PRB and a control channel with a common reference signal.

3. The common control channel resource allocation method of claim 1, wherein allocating the resources for a common control channel comprises assigning the common control channel resources across two consecutive slots following the PRB and control channel with a common reference signal.

4. The common control channel resource allocation method of claim 1, wherein allocating the resources for a common control channel comprises assigning the common control channel resources across consecutive PRBs and two consecutive slots.

5. A common control channel resource allocation method of a base station transmitter, comprising:
determining a carrier type; and
determining, when the carrier is a non-backward compatible carrier, a location of a common control channel of a non-backward compatible cell based on a location of a common control channel of a backward compatible cell.

6. A common control channel reception method of a terminal receiver, comprising:
determining a carrier type;
receiving a Physical Control Format Indicator CHannel (PCFICH) using a common reference signal, when the carrier is a backward compatible carrier; and
receiving a control channel region with the common reference signal and a control channel region with a dedicated reference signal.

7. The common control channel reception method of claim 6, wherein receiving the control channel region comprises receiving a common control channel with the dedicated reference signal in a region of a Physical Resource Block (PRB) including a Resource Element Group (REG) to which the PCFICH is mapped and a first slot.

8. The common control channel reception method of claim 6, wherein receiving the control channel region comprises receiving a common control channel in a region of consecutive Physical Resource Blocks (PRBs) including a Resource Element Group (REG) to which the PCFICH is mapped and two consecutive slots.

9. A control channel reception method of a terminal receiver, comprising:
determining a carrier type;
receiving a Physical Control Format Indicator CHannel (PCFICH) using a common reference signal, when the carrier is a backward compatible carrier; and
receiving a control channel region with a dedicated reference signal without receipt of a control channel region with a common reference signal.

10. The control channel reception method of claim 9, wherein receiving the control channel region comprises receiving a common control channel in a region of a Physical Resource Block (PRB) including a Resource Element Group (REG) to which the PCFICH is mapped and a first slot.

11. The control channel reception method of claim 9, wherein receiving the control channel region comprises receiving a common control channel in a region of consecutive Physical Resource Blocks (PRBs) including a Resource Element Group (REG) to which the PCFICH is mapped and two consecutive slots.

12. A control channel reception method of a terminal receiver, comprising:
determining a carrier type;
calculating, when the carrier is a non-backward compatible carrier, a location of a common control channel of the non-backward compatible carrier which is mapped based on a location of the common control channel of a backward compatible carrier; and
receiving the common control channel at the calculated location.

13. A base station transmitter comprising:
a common control information generator which generates common control channel information;
a dedicated control information generator which generates terminal-specific dedicated control channel information;
a controller which allocates, when a carrier is a backward compatible carrier, resources for a Physical Control Format Indicator CHannel (PCFICH) and resources for a common control channel with a dedicated reference signal based on a Physical Resource Block (PRB) allocated for the PCFICH and allocates, when the carrier is a non-backward compatible carrier, resources for a common control channel of a non-backward compatible cell based on the location of the common control channel of a backward compatible cell; and
a mapper which maps the control channels to corresponding resources under the control of the controller.

14. A signal reception apparatus of a terminal, comprising:
a receiver which receives a signal transmitted by a base station;
a controller which calculates a location of a control channel region based on a Physical Control Format Indicator CHannel (PCFICH) and receives a control channel at the calculated location; and
a Physical Downlink Control CHannel (PDCCH) decoder and an evolved PDCCH (ePDCCH) decoder which process a signal in the control channel region under the control of the controller.

* * * * *